United States Patent [19]

Spurgeon et al.

[11] Patent Number: 5,082,017
[45] Date of Patent: Jan. 21, 1992

[54] ANTI-SIPHON BALL COCK WITH VOLUME CONTROL

[75] Inventors: Gordon L. Spurgeon, Surfside Beach; Charles M. McGhee, Myrtle Beach, both of S.C.; Frank C. Evans, Hillsdale, Mich.

[73] Assignee: Wolverine Brass, Inc., Conway, S.C.

[21] Appl. No.: 659,694

[22] Filed: Feb. 25, 1991

[51] Int. Cl.⁵ ............................................. F16K 24/02
[52] U.S. Cl. .................................. 137/217; 137/218; 137/436
[58] Field of Search .................. 137/217, 218, 436

[56] References Cited

U.S. PATENT DOCUMENTS

| | | | |
|---|---|---|---|
| 1,182,903 | 5/1916 | Grossmann | 137/436 X |
| 2,282,188 | 5/1942 | Horne | 137/218 |
| 2,304,272 | 12/1942 | Mueller et al. | 137/436 |
| 2,324,084 | 7/1943 | Horner. | |
| 2,777,460 | 1/1957 | Svirsky. | |
| 2,941,542 | 6/1960 | Jacobson. | |
| 2,960,996 | 11/1960 | Haselton. | |
| 3,076,470 | 2/1963 | Langdon. | |
| 3,171,424 | 3/1965 | Shames et al.. | |
| 3,180,352 | 4/1965 | Kersten et al.. | |
| 3,419,036 | 12/1968 | Ward | 137/218 |
| 3,470,898 | 10/1969 | Langdon | 137/218 |
| 3,822,717 | 7/1974 | Thorne-Symmons et al. | 137/218 |
| 3,952,770 | 4/1976 | Botnick | 137/218 X |
| 4,475,570 | 10/1984 | Pike et al.. | |
| 4,592,382 | 6/1986 | Rubin et al.. | |

Primary Examiner—Gerald A. Michalsky
Attorney, Agent, or Firm—Dennison, Meserole, Pollack & Scheiner

[57] ABSTRACT

A ball cock for a flush tank having a valve chamber connected with a discharge chamber. A float operated piston valve is mounted in the valve chamber to control water flow to the discharge chamber. A hush tube connected to the discharge chamber feeds the water to the bottom of the flush tank. A combined volume control and anti-siphon valve is mounted in the discharge chamber between the inlet and hush tube to regulate the rate of flow and to act as a vacuum break under conditions of negative pressure in the water supply line.

26 Claims, 4 Drawing Sheets

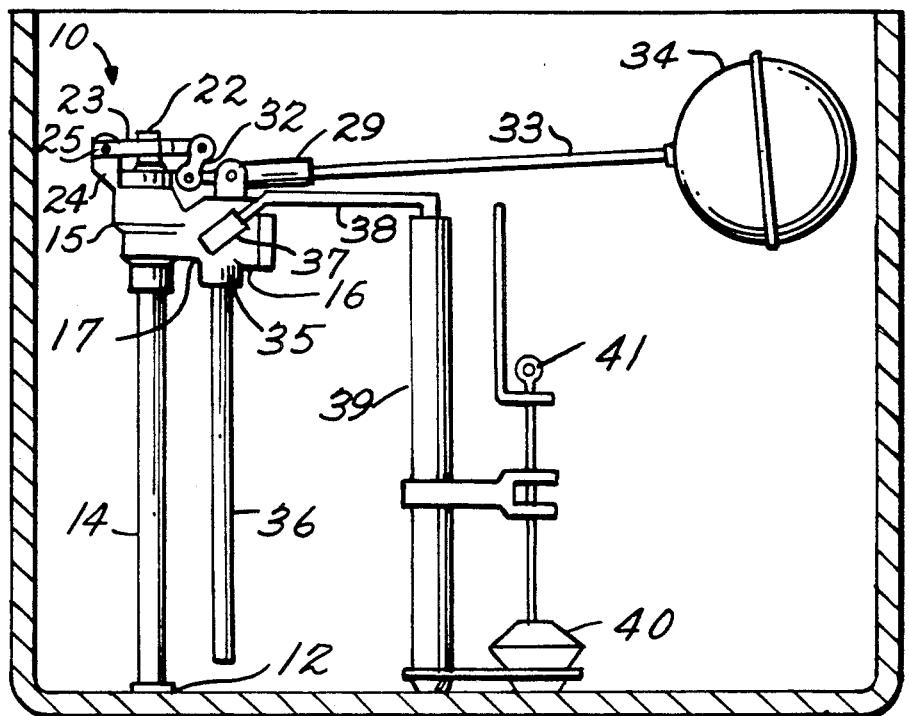
Fig. 1.
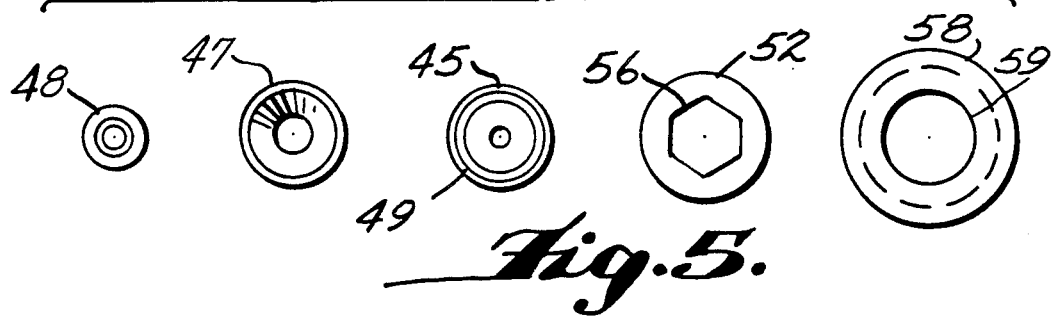
Fig. 5.
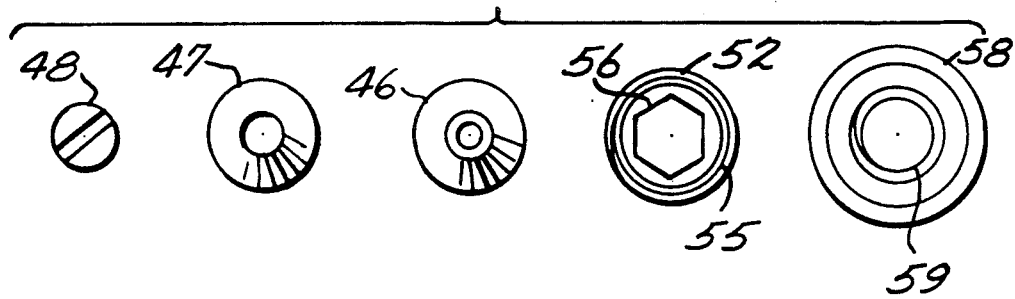

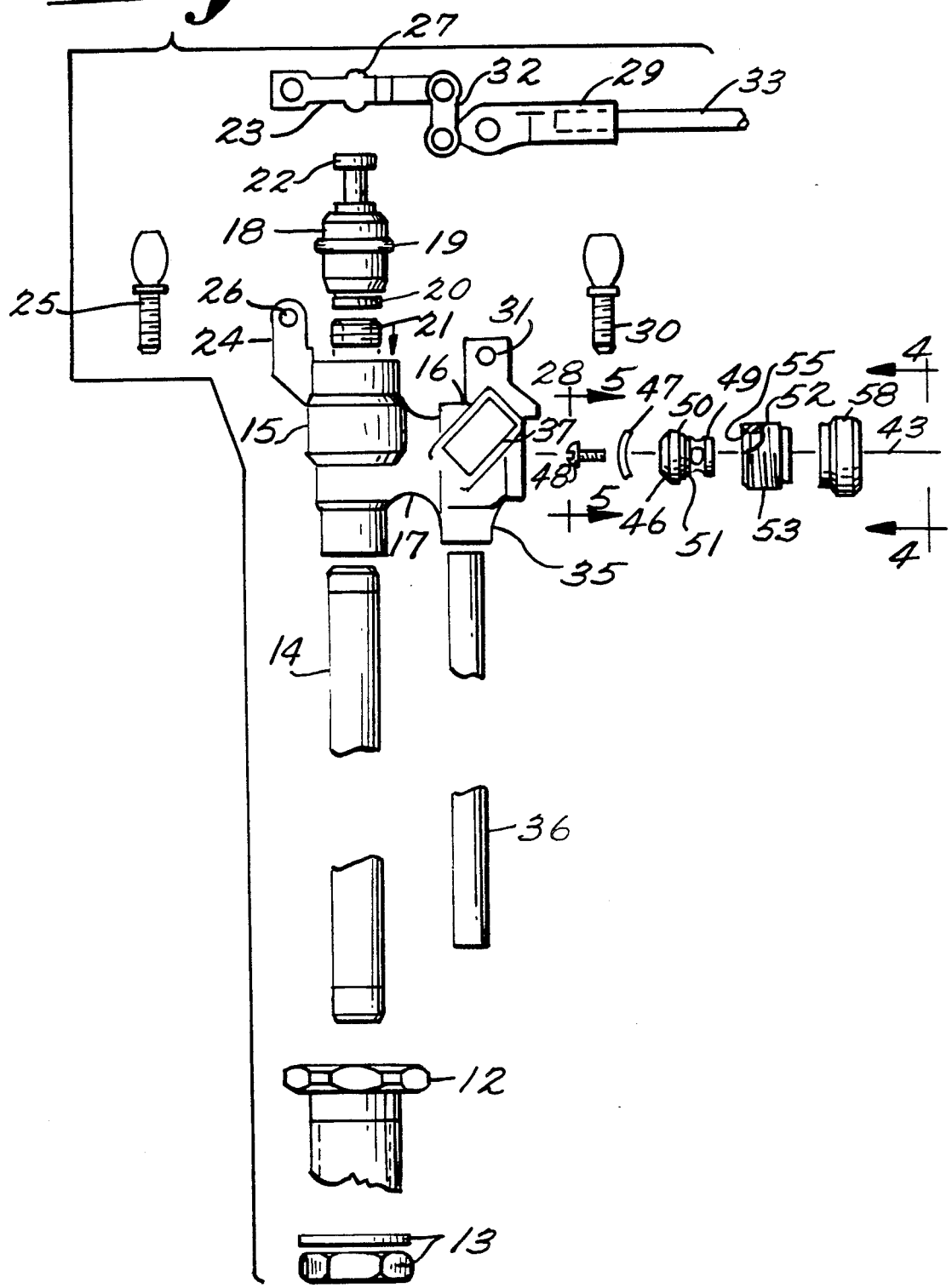

ANTI-SIPHON BALL COCK WITH VOLUME CONTROL

BACKGROUND OF THE INVENTION

This invention relates to a ball cock assembly having a novel combined volume control and anti-siphon feature integrated with the discharge portion of the valve assembly. Ball cock assemblies of the type under discussion here are employed to fill the flush tank of toilets. The service is demanding in that the valve must be designed to operate over long periods of time yet be capable of a positive shutoff after each operation to prevent water wastage. Superimposed on the above basic design criteria is the need to achieve a relatively quiet operation and the need to prevent any backflow of tank water into the supply line under water supply failure conditions.

Noise has always been a problem associated with the filling of the flush tank. The noise comes from three main sources (1) noise generated by the water turbulating around the valve seat and restrictions in the exit port; (2) noise generated by water splashing into the flush tank; and (3) noise generated by a heavy water flow in the supply piping itself. Some noise reduction has been achieved by the use of a hush tube which conducts the water discharged by the valve to the bottom of the flush tank. In this manner the outlet of the hush tube is submerged under water eliminating splashing noise and at the same time muffling some of the noise generated at the valve. While the hush tube has been partially effective, noise generation still remains a problem, particularly at higher water pressure.

The use of a hush tube has created a secondary problem in that the discharge outlet has been located below the water level in the flush tank, and if a negative pressure develops in the water supply line contaminated tank water can be drawn into the water supply. Plumbing codes recognize this hazard and require that an anti-siphon feature be designed into the valve so that under conditions of negative pressure in the supply line the inlet of the hush tube is exposed to atmospheric pressure. The anti-siphon feature takes the form of a vacuum break device situated between the outlet of the ball cock and the inlet to the hush tube.

There is a large body of art directed to ball cocks with an anti-siphon feature as typified by U.S. Pat, No. 2,777,460, issued Jan. 15, 1957 to Bennett Svirsky; U.S. Pat. No. 2,941,542, issued June 21, 1960 to David I. Jacobson and U.S. Pat. No. 3,171,424, issued Mar. 2, 1965 to Harold Shames et al. The patent to Svirsky shows an anti-siphon valve located between the fill valve and the top of a hush tube. Under conditions of zero or negative pressure the anti-siphon valve vents the hush tube to atmospheric pressure. Jacobson shows an anti-siphon ball valve movable to a first position connecting the fill valve to the hush tube and to a second position venting the hush tube to atmospheric air when the pressure in the supply line goes zero or negative. Shames et al show an anti-siphon disc valve movable to a first sealing position to provide a direct passage from the fill valve to the hush tube and to a second position to vent the hush tube to atmospheric pressure. While the above mentioned patents do show ball cocks with an anti-siphon valve to vent the hush tube to atmospheric air under conditions of negative pressure, the prior art does not teach a combined anti-siphon valve and volume control.

SUMMARY OF THE INVENTION

It is an overall object of the present invention to improve upon the prior art ball cocks by providing a combined anti-siphon valve and volume control of a simple compact nature which can be readily integrated into existing designs.

It is a specific object of the invention to provide the model 50565 ball cock manufactured by Wolverine Brass Inc. of Conway, S.C., Assignee of the present invention, with a combined volume control and anti-siphon valve. The combined volume control and anti-siphon valve can be installed in the existing body of the model 50565 ball cock without any modification thereby eliminating the need for expensive retooling.

It is another object of the invention to provide a combined volume control and anti-siphon valve formed of six simple components linearly arranged in a compact relationship. Relative slidable movement between the anti-siphon valve and its seat occasioned by an abnormal differential pressure enables the valve to move away from its seat and function as a vacuum break. When conditions are restored to normal the anti-siphon valve can shift back to its blocking position and function as part of a volume control.

It is another object of the invention to provide a ball cock having a combined volume control and anti-siphon valve wherein the parts are readily accessible for removal and inspection. A screw driver and Allen wrench are the only tools required to effect installation and adjustment of the unit.

BRIEF DESCRIPTION OF THE DRAWINGS

FIG. 1 is a vertical cross-sectional view of a flush tank with the ball cock of the invention mounted therein;

FIG. 2 is an exploded view of the ball cock assembly showing the relationship between the parts;

FIG. 4 shows the components of the combined volume control and anti-siphon valve looking to the left from lines 4—4 in FIG. 2;

FIG. 5 shows the components of the combined volume control and anti-siphon valve looking to the right from lines 5—5 in FIG. 2;

DESCRIPTION OF THE PREFERRED EMBODIMENT

Figure 3:
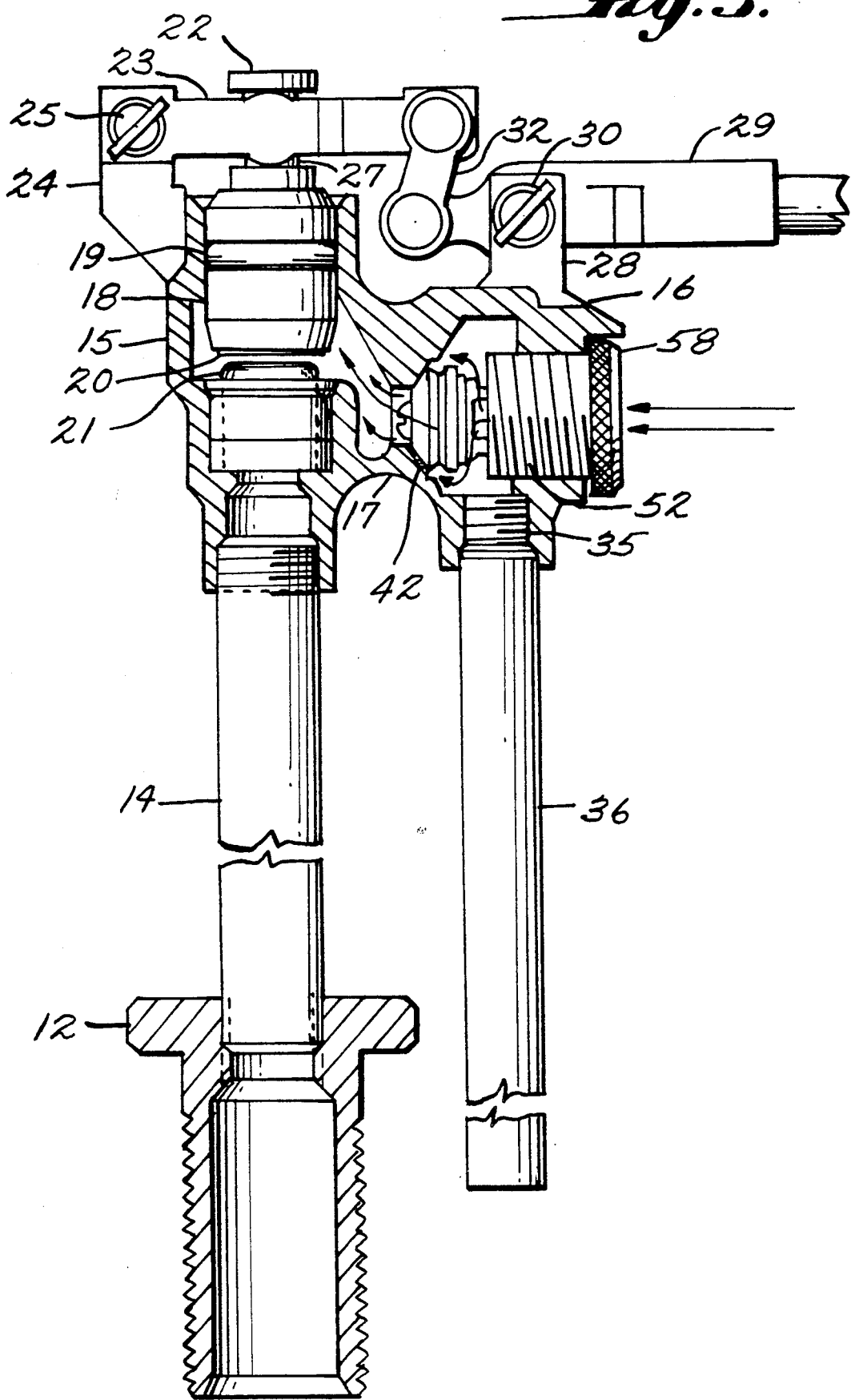
FIG. 3 is an enlarged cross-sectional view of the ball cock with the combined volume control and anti-siphon valve in the vacuum break position.

Referring now in general to the drawings and in particular to FIGS. 1-3, the ball cock 10 is mounted on the bottom of flush tank 11 by means of shank 12 and the usual lock nut and washers shown at 13. A water supply line (not shown) is attached to the bottom of shank 12. A standpipe 14 extends vertically upwardly from shank 12 and at its upper end supports a fill valve chamber 15 and a discharge chamber 16 connected by a hollow bridging section 17 to place the two chambers in fluid flow communication.

The fill valve chamber 15 contains a sliding piston valve 18 which is maintained in fluid tight relationship with the cylindrical walls of valve chamber 15 by means of 0-ring seal 19. A flat washer 20 is press fitted into the base of piston valve 18 to move into seating relationship with threaded valve seat insert 21. A stem and head operator 22 is provided at the top of valve 18 with the stem trapped between the arms of a bifurcated lever 23 and the head positioned above it. Bifurcated lever 23 straddles a lug 24 projecting upwardly from valve chamber 15 and is pivoted thereto by means of a first pivot pin 25 inserted in first pivot holes 26. Bifurcated lever 23 has cam projections 27 acting between the base and head of the stem operator 22 to move valve 18 up or down as the lever 23 is rocked around pivot pin 25.

A second lug 28 projects upwardly from discharge chamber 16 and pivotally supports a float arm lever 29 by means of a second pivot pin 30 inserted in second pivot holes 31. Bifurcated lever 23 is connected to float arm lever 29 at one end by pivotally mounted link 32. The other end of float arm lever 29 receives a float rod 33 connected to float 34. It can be seen from FIG. 1 that as the float 34 falls the bifurcated lever 23 acts to raise piston valve 18 off of seat 21 to permit water to enter chamber 15. When the float rises, bifurcated lever 23 acts to drive piston valve 18 against seat 21 to interrupt the flow of water.

Supply water leaving valve 18 passes through hollow bridging chamber 17 and enters discharge chamber 16 where it divides into two flow paths, one being much larger than the other. The larger flow path extends through a main port 35 on the bottom of discharge chamber 16. A hush tube 36 is connected to port 35 and discharges the water near the bottom of flush tank 11. As explained above, the function of the hush tube is to eliminate splashing noise by discharging the water below the water level in the tank in a smooth pattern with minimum turbulence. Also, since the outlet of the hush tube is under water, it helps muffle the noise generated by the water flowing through chambers 15 and 16.

The smaller flow path extends form discharge chamber 16 through a reduced passage in an embossment 37 provided on the side of chamber 16. A refill tube 38 connects with the flow passage in embossment 37 and leads to the top of overflow pipe 39. Water flow in the refill tube 38 is always in parallel with the main flow down the hush tube 36 and its function is to supply water to the toilet bowl and to seal the trap in the sewage outlet.

A flush valve 40 is connected to overflow pipe 39 and is operated by the usual handle and linkage generally shown at 41/

The structure described up to this point is conventional and is shown in the prior art, and is employed in the Wolverine ball cock 50565. It is also known to associate pressure regulators and volume controls with ball cocks. However, the prior art does not teach a combined volume control and anti-siphon valve which will now be described.

Figure 6:
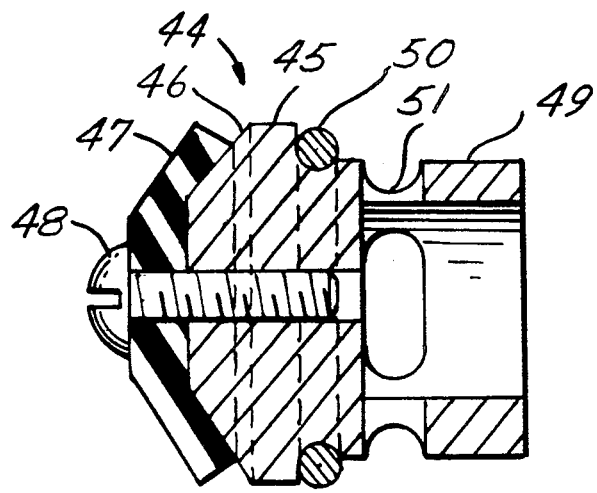
FIG. 6 shows the double acting valve of FIGS. 3-6 on a much larger scale.
Figure 7:
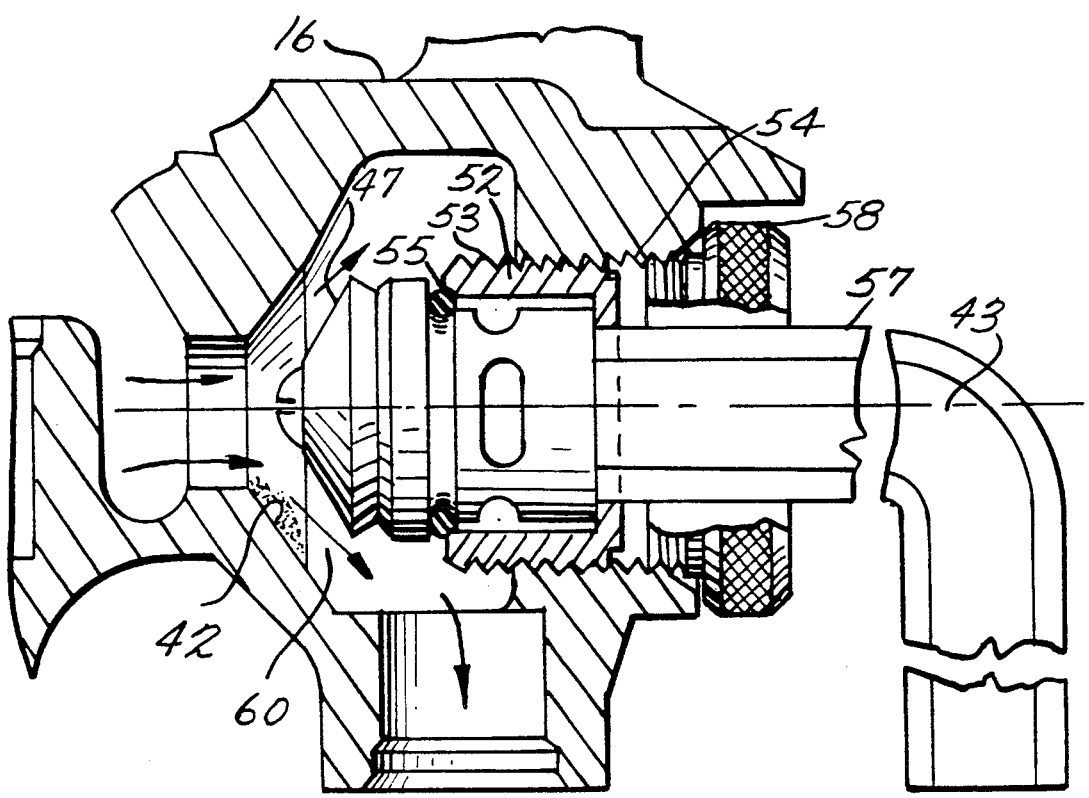
FIG. 7 is an enlarged cross-sectional view of the discharge chamber of the ball cock with the combined volume control and anti-siphon valve in the water feed position.

As was discussed above, the penalty attached to the use of a hush tube is the need to provide a vacuum break under conditions of negative pressure in the supply line. The invention accomplishes this result in a simple manner while at the same time employing the same structure to act as a volume control. Referring to FIGS. 3 and 7, an imperfect valve seat 42 is provided on an inside wall of chamber 16 surrounding axis 43. The reason for having the seat imperfect will be presently explained. Co-operating with seat 42 is a double acting sliding valve 44 (FIG. 6) formed of a durable plastic material. The valve has a main cylindrical section 45 with a conical forward face 46. A pliable snubber washer 47 of a shape matching the conical face 46 is mounted thereon by means of screw 48. FIG. 3 shows snubber washer 47 facing imperfect valve seat 42. A hollow tail section 49 extends rearwardly of cylindrical section 45. The tail section supports an 0-ring washer 50 in a groove immediately behind cylindrical section 45. The tail section 49 contains a number of openings 51 around the periphery to enable the free flow of air from the inside to the outside.

The tail section 49 is slidably received with a loose fit within a tubular barrel 52. The exterior of barrel 52 is threaded at 53 to mate with an internal thread 54 in a bore provided in the rear wall of discharge chamber 16. The front rim of barrel 52 is inwardly tapered to form a seat 55 to receive O-ring washer 50. The rear rim of barrel 52 is provided with a hexagonal opening 56 to receive an Allen wrench 57. Turning barrel 52 by Allen wrench 57 positions tapered seat 55 axially along axis 43 to a desired position. A knurled and threaded stop plug 58 is threaded into threads 54 in chamber 16 to provide a limit stop for movement of barrel 52. Stop plug 58 has an opening 59 of a diameter larger than hexagonal opening 56 so that Allen wrench 57 can be passed through the stop plug to engage hexagonal opening 56 to adjust the position of barrel 52.

The combination of stop plug 58, barrel 52, double acting sliding valve 44 with washer 47 and O-ring 50 and screw 48 forms a compact unit linearly arranged along axis 43 within chamber 16. Axial movement of the double acting valve 44 acts to regulate flow in one position and as a vacuum break in another position as explained below.

In the tank filling mode, after the toilet is flushed by raising flush valve 40, float 34 drops thereby rocking bifurcated lever 23 counterclockwise around first pivot pin 25 piston valve 18 away from seating position with valve to urge piston valve 18 away from seating position with valve seat 21. Water under pressure flows through the open valve 18, 21 into bridging section 17 and enters discharge chamber 16 through imperfect valve seat 42 (FIG. 7). The flow of water acting on snubber washer 47 pushes valve 44 into tubular barrel 52 until O-ring washer 50 seats in tapered seat 55 on the forward edge of barrel 52. Water is prevented from flowing through hexagonal opening 56 and stop plug opening 59 and is confined to flow into the hush tube 36 and refill tube 38

At the same time that valve 44 is in the stopped position with O-ring 50 seated in seat 55, snubber washer 47 is in confronting relationship with imperfect seat 42. Depending upon the position of tubular barrel 52 in threads 54 as determined by the adjustment of the barrel with Allen wrench 57, a restricted flow orifice 60 is defined between snubber washer 44 and imperfect seat 42. The seat 42 is characterized as imperfect since it is not a uniform symmetrical seat around axis 43 to positively receive the snubber washer 47. It is not intended that this seal provide a complete shutoff of flow but is designed to have an incomplete seat portion shown at the bottom of 42 in FIGS. 3 and 7 which does not contact snubber washer 47 and provides a greater flow area. Relative water flow in the gap formed between 42 and 47 is shown by the flow arrows in FIG. 7.

It can be seen in FIG. 7 that by adjusting the gap between imperfect seat 42 and snubber washer 47 a restricted orifice 60 can be obtained which will regulate the output of water. This feature is particularly useful at high water pressure to reduce piping noise. Also, the snubber washer 47 created at the orifice. Noise reduction is further aided by providing a zone of greater flow as at 60 in cooperation with imperfect seat 42. It has been determined through experimentation that an imperfect seat as disclosed generates less noise than a completely symmetrical seat. Additionally, the presence of an imperfect seat prevents a complete shutoff of flow when the unit is improperly adjusted by an inexperienced operator.

In explaining the anti-siphon mode, assume the flush tank is being filled in accordance with the action described in connection with the fill mode and that there is a sudden interruption in the water supply. Water will drain back down standpipe 14 creating a vacuum in fill valve chamber 15. As shown in FIG. 3, as soon as this occurs, atmospheric pressure acting through barrel 52 pushes double acting valve forwardly to abut imperfect seat 42. In so doing, O-ring 50 is moved away from its seat 55 to expose openings 51 in tail section 49 to bring the internal volume of chamber 16 and the inlet to hush tube 36 to atmospheric pressure. The movement of air in the anti-siphon mode is shown by the feathered arrows in FIG. 3. A certain amount of air will be drawn through imperfect seat 42, particularly at its relieved zone, from chamber 16 into the vacuum in standpipe 14. However, the replacement supply through openings 51 and the loose clearance in barrel 52 will be great enough to maintain chamber 16 at atmospheric pressure and thus prevent any water from being sucked into the water supply from the hush tube.

The actual linear travel of double acting valve 44 between the anti-siphon position and the volume control position is much less than the exaggerated movement shown in FIGS. 3 and 7 which were drawn for illustrative purposes. Because of the relatively large sealing area of O-ring washer 50 only a slight movement is required to relieve the negative pressure in chamber 16.

It is not intended to limit the present invention to the details of illustration or terms of description of the single preferred embodiment shown above. It will be appreciated by those skilled in the art that various modifications and alterations therein may be made within the scope of the present invention.

What is claimed is:

1. In a ball cock having a unitary casing divided into a valve chamber and a discharge chamber, each having an inlet and outlet, means connecting the outlet of said valve chamber with the inlet of said discharge chamber, a float controlled valve in said valve chamber for feeding fluid to said discharge chamber, a hush tube connected to said outlet of said discharge chamber, a combined adjustable volume rate regulator and anti-siphon valve assembly within said discharge chamber in the fluid path between said discharge chamber inlet and said hush tube, said combined volume rate regulator and anti-siphon valve assembly comprising a valve seat at said discharge chamber inlet, a tubular barrel aligned with said inlet valve and having an opening at one end in communication with the atmosphere and a rim valve seat at the other end; and a double acting valve horizontally slidable in said tubular barrel between a first position wherein said double acting valve is in spaced confronting relationship with said inlet valve seat and is in engagement with said rim valve seat to a second position wherein said double acting valve abuts said inlet valve seat and is disengaged from said rim valve seat, and means for adjusting the spacing between the inlet valve seat and the double acting valve to effect volume rate regulation.

2. The apparatus as claimed in claim 1 wherein said double acting valve is in said first position when fluid flows from said valve chamber into said discharge chamber and said double acting valve is in said second position when negative pressure exists in said valve chamber.

3. The apparatus as claimed in claim 2 wherein air under atmospheric pressure enters said valve chamber through said tubular barrel when said double acting valve is in said second position to prevent negative pressure from existing at the inlet of said hush tube.

4. The apparatus as claimed in claim 1 wherein said double acting valve comprises a housing having a main cylindrical section with a front conical face and a rear tubular tail piece of a lesser diameter than the cylindrical section, a conical washer mounted on said front conical face; and an O-ring washer mounted on said tail piece immediately behind said main cylindrical section.

5. The apparatus as claimed in claim 4 wherein said tubular tail piece is slidably received in said tubular barrel first position.

6. The apparatus as claimed in claim 5 wherein said conical washer and said front conical face are slightly spaced from said inlet valve seat to define a restricted orifice therewith when said O-ring washer engages said rim valve seat.

7. The apparatus as claimed in claim 4 wherein said tubular tail piece is provided with a series of circumferential holes.

8. The apparatus as claimed in claim 1 wherein said discharge chamber is provided with a threaded bore coaxially aligned with said inlet valve seat, said tubular barrel provided with external threads and being threaded into said threaded bore to position said rim valve seat at a predetermined position.

9. The apparatus as claimed in claim 8 wherein said opening in said tubular barrel is of a shape to receive a tool to adjust the position thereof in said threaded bore.

10. The apparatus as claimed in claim 9 wherein said opening in said tubular barrel is of hexagonal shape and said tool is an Allen wrench.

11. The apparatus as claimed in claim 9 wherein a stop plug is threaded into said threaded bore of said discharge chamber to limit outward travel of said tubular barrel; said stop plug having an opening greater than the opening in said tubular barrel.

12. The apparatus as claimed in claim 1 wherein said inlet valve seat is of irregular shape to produce a controlled leakage when said double acting valve is in said second position.

13. In a ball cock having a unitary casing divided into a valve chamber and a discharge chamber, each having an inlet and outlet, means connecting the outlet of said valve chamber with the inlet of said discharge chamber, a float controlled valve in said valve chamber for feeding fluid to said discharge chamber, a hush tube connected to said outlet of said discharge chamber, a valve seat at said discharge chamber inlet; and a horizontally slidable double acting valve means within said discharge chamber acting in the fluid path between said inlet valve seat and said hush tube for regulating the rate of flow and for preventing backflow from the hush tube to the valve chamber, and means for adjusting the spacing between the inlet valve seat and the double acting valve means to effect volume rate regulation.

14. A combined flow regulator and anti-siphon valve assembly comprising a valve chamber having a liquid inlet and at least one liquid outlet, an air outlet venting said chamber to atmospheric pressure, a first valve seat in said chamber at said liquid inlet, said first valve seat being imperfect to permit a controlled amount of leakage, a threaded bore in said chamber at said air outlet, second valve seat means adjustably mounted in said threaded bore to place said second valve seat means at a predetermined position within said chamber; and double acting horizontally slidable valve means between said first and second seats operable in a first position to engage said second seat and partially restrict said first seat when liquid flows through said liquid inlet and in a second position to disengage said second seat when negative pressure exists at said liquid inlet.

15. The apparatus as claimed in claim 14 wherein said second valve seat means comprises a tubular barrel aligned with said first valve eat, said tubular barrel having external threads to be received in said threaded bore and having an opening at one end in communication with said atmospheric air outlet and a valve rim seat at the other end.

16. The apparatus as claimed in claim 15 wherein said opening in said tubular barrel is shaped to receive a hand tool whereby said tubular barrel can be threaded in said threaded bore to place said rim seat at a predetermined location to set said restricted opening defined by said double acting valve means in said first position.

17. The apparatus as claimed in claim 15 wherein said double acting valve comprises a housing having a main cylindrical section with a front conical face and a rear tubular tail piece of a lesser diameter than the cylindrical section, a conical washer mounted on said front conical face; and an O-ring washer mounted on said tail piece immediately behind said main tubular section.

18. The apparatus as claimed in claim 17 wherein said tubular tail piece is slidably received in said tubular barrel and said O-ring washer engages said rim valve seat in said first position.

19. The apparatus as claimed in claim 18 wherein said tubular tail piece is provided with circumferential holes to permit free passage of air in said second position.

20. In a ball cock having a valve chamber and a discharge chamber, each having an inlet and outlet, means connecting the outlet of said valve chamber with the inlet of said discharge chamber, a float controlled valve in said valve chamber for feeding fluid to said discharge chamber, a hush tube connected to said outlet of said discharge chamber, a combined volume rate regulator and anti-siphon valve assembly in the fluid path between said discharge chamber inlet and said hush tube, said combined volume regulator and anti-siphon valve assembly comprising a valve seat at said discharge chamber inlet, a tubular barrel aligned with said inlet valve seat and having an opening at one end in communication with the atmosphere and a rim valve seat at the other end, and a double acting valve slidable in said tubular barrel between a first position wherein said double acting valve is in spaced confronting relationship with and inlet valve seat and is in engagement with said rim valve seat to a second position wherein said double acting valve abuts said inlet valve seat and is disengaged from said rim valve seat, said double acting valve comprising a housing having a main cylindrical section with a front conical face and a rear tubular tail piece of a lesser diameter than the cylindrical section, a conical washer mounted on said front conical face; and an O-ring washer mounted on said tail piece immediately behind said main cylindrical section.

21. The apparatus as claimed in claim 20 wherein said tubular tail piece is slidably received in said tubular barrel and said O-ring washer engages said rim valve seat in said first position.

22. The apparatus as claimed in claim 21 wherein said conical washer and said front conical face are slightly spaced from said inlet valve seat to define a restricted orifice therewith when said O-ring washer engages said rim valve seat.

23. The apparatus as claimed in claim 20 wherein said tubular tail piece is provided with a series of circumferential holes.

24. A combined flow regulator and anti-siphon valve assembly comprising a valve chamber having a liquid inlet and at least one liquid outlet, an air outlet venting said chamber to atmospheric pressure, a first valve seat in said chamber at said liquid inlet, a threaded bore in said chamber at said air outlet, second valve seat means adjustably mounted in said threaded bore to place said second valve seat means at a predetermined position within said chamber, and double acting valve means between said first and second seats operable in a first position to engage said second seat and partially restrict said first seat when liquid flows through said liquid inlet and in a second position to disengage said second seat when negative pressure exists at said liquid inlet, said second valve seat means comprising a tubular barrel aligned with said first valve seat, said tubular barrel having external threads to be received in said threaded bore and having an opening at one end in communication with said atmospheric air outlet and a valve rim seat at the other end, and wherein said double acting valve comprises a housing having a main cylindrical section with a front conical face and a rear tubular tail piece of a lesser diameter than the cylindrical section, a conical washer mounted on said front conical face; and an O-ring washer mounted on said tail piece immediately behind said main cylindrical section.

25. The apparatus as claimed in claim 24 wherein said tubular tail piece is slidably received in said tubular barrel and said O-ring washer engages said rim valve seat in said first position.

26. The apparatus as claimed in claim 25 wherein said tubular tail piece is provided with circumferential holes to permit free passage of air in said second position.

* * * * *